United States Patent
Hatano et al.

(10) Patent No.: US 11,383,309 B2
(45) Date of Patent: Jul. 12, 2022

(54) CUTTING TOOL AND METHOD FOR MANUFACTURING MACHINED PRODUCT

(71) Applicant: KYOCERA Corporation, Kyoto (JP)

(72) Inventors: Hirokazu Hatano, Otsu (JP); Kouji Kawashima, Yasu (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/960,769

(22) PCT Filed: Jan. 10, 2019

(86) PCT No.: PCT/JP2019/000511
§ 371 (c)(1),
(2) Date: Jul. 8, 2020

(87) PCT Pub. No.: WO2019/139075
PCT Pub. Date: Jul. 18, 2019

(65) Prior Publication Data
US 2020/0353542 A1    Nov. 12, 2020

(30) Foreign Application Priority Data

Jan. 12, 2018  (JP) .............................. JP2018-003201

(51) Int. Cl.
*B23B 51/02*    (2006.01)
(52) U.S. Cl.
CPC .......... *B23B 51/02* (2013.01); *B23B 2251/02* (2013.01); *B23B 2251/40* (2013.01); *B23B 2251/50* (2013.01)

(58) Field of Classification Search
CPC .............. B23B 2251/127; B23B 51/02; B23B 2251/14; B23B 2251/40; B23B 2251/50; B23B 2251/087; B23B 2251/02
See application file for complete search history.

(56) References Cited

U.S. PATENT DOCUMENTS 8,882,413 B2 *  11/2014  Hecht ..................... B23B 51/02
                                                         408/231
2013/0183112 A1   7/2013  Schwaegerl et al.
(Continued)

FOREIGN PATENT DOCUMENTS

DE    102007020051 A1    10/2008
JP        2013-146854 A    8/2013
(Continued)

*Primary Examiner* — Eric A. Gates
*Assistant Examiner* — Paul M Janeski
(74) *Attorney, Agent, or Firm* — Volpe Koenig

(57) ABSTRACT

A drill may be extended from a first end to a second end and may include a cutting part. The cutting part may include a cutting edge, a flute, an end surface and a connection surface. The flute may be extended from the cutting edge toward the second end. The end surface may be located closer to the second end than the flute. The connection surface may be located between the flute and the end surface. The connection surface may include a first portion, and a second portion located closer to an outer periphery of the cutting part than the first portion. A length in the direction along the rotation axis on the second portion may be smaller than a length in the direction along the rotation axis on the first portion in a side view orthogonal to the rotation axis.

12 Claims, 15 Drawing Sheets

(56) References Cited

U.S. PATENT DOCUMENTS

2014/0147224 A1   5/2014  Hecht
2015/0266108 A1*  9/2015  Koga ..................... B23B 51/02
                                                    408/1 R

FOREIGN PATENT DOCUMENTS

JP    2015-535493 A    12/2015
JP    2016-055353 A     4/2016

* cited by examiner

CUTTING TOOL AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2019/000511 filed on Jan. 10, 2019, which claims priority to Japanese Application No. 2018-003201 filed on Jan. 12, 2018, which is entirely incorporated herein by reference.

TECHNICAL FIELD

The present disclosure relates to a drill and a method for manufacturing a machined product.

BACKGROUND

For example, a head replaceable type drill is discussed in Japanese Unexamined Patent Publication No. 2016-55353 (Patent Document 1) as a head replaceable type drill which includes a head provided with a cutting edge, a seating surface and a flute extended from the cutting edge toward the seating surface and which includes a holder. The seating surface of the head may be in contact with an end surface of the holder.

A ridgeline may be formed by an approximately vertical intersection of the flute and the seating surface of the head in the head replaceable type drill discussed in Patent Document 1. Stress concentration may occur at a ridgeline part during a cutting process, resulting in a fracture.

SUMMARY

A drill in a non-limiting embodiment may have a columnar shape extended from a first end to a second end, and may include a cutting part rotatable around a rotation axis. The cutting part may include a cutting edge, a flute, an end surface and a connection surface. The cutting edge may be located on a side of the first end. The flute may be extended from the cutting edge toward the second end. The end surface may be located closer to the second end than the flute. The connection surface may be located between the flute and the end surface and may connect to the flute and the end surface. The connection surface may include a first portion and a second portion. The second portion may be located closer to an outer periphery of the cutting part than the first portion. A length in a direction along the rotation axis on the second portion may be smaller than a length in the direction along the rotation axis on the first portion in a side view orthogonal to the rotation axis.

DETAILED DESCRIPTION

Figure 1:
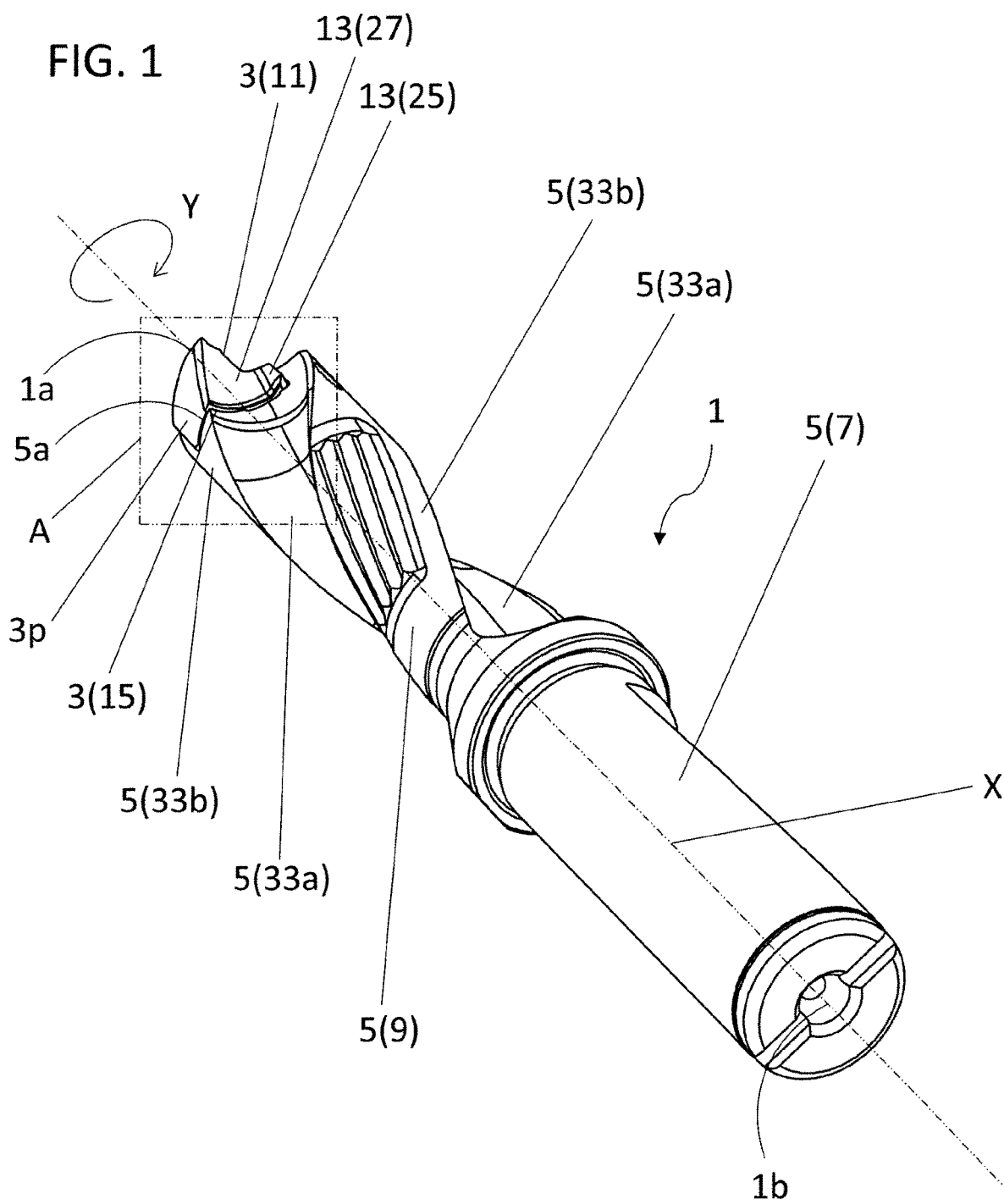
FIG. 1 is a perspective view illustrating a drill in a non-limiting embodiment.

Drills in non-limiting embodiments may be described in detail below with reference to the drawings. For the sake of description, each of the drawings referred to in the following may illustrate, in a simplified form, only main members among ones which form the non-limiting embodiments. The drills may therefore be capable of including any arbitrary structural member not illustrated in the drawings referred to in the present specification. Dimensions of the members in each of the drawings may be ones which faithfully represent neither dimensions of actual structural members nor dimension ratios of these members.

The drill 1 may have a columnar shape extended from a first end 1*a* to a second end 1*b* in the non-limiting embodiments illustrated in FIG. 1. The drill 1 may include a cutting part 3 which is located on a side of the first end 1*a* and rotatable around a rotation axis X in the present disclosure. The drill 1 having the columnar shape may be rotatable in an arrowed direction Y around the rotation axis X as illustrated in FIG. 1 during a cutting process of a workpiece which is intended to manufacture a machined product.

An end portion on an upper left side in the drill 1 illustrated in FIG. 1 may correspond to the first end 1*a*, and an end portion on a lower right side may correspond to the second end 1*b*. In general, the first end 1*a* may also be called "a front end" and the second end 1*b* may also be called "a rear end." Therefore, the first end 1*a* may be referred to as the front end 1*a*, and the second end 1*b* may be referred to as the rear end 1*b* in the following description.

An outer diameter of the drill 1 may be settable to, for example, 4-25 mm in the non-limiting embodiments. Specifically, the drill 1 in the non-limiting embodiments may be settable to, for example, L=4D to L=15D where L is a length thereof in a direction along the rotation axis X and D is the outer diameter.

The drill 1 may include the cutting part 3 located on a side of the front end 1*a*, and a holder 5 which has a columnar shape and is located on a side of the rear end 1*b* as a whole than the cutting part 3. The holder 5 may include a shank part 7 and a body 9 located closer to the front end 1*a* than the shank part 7.

The cutting part 3 and the body 9 may individually include a portion brought into contact with a workpiece, and these portions may be capable of performing a major role in a cutting process of the workpiece. The shank part 7 may be a part which is held by a spindle being rotated in a machine tool and which is designed according to a shape of the spindle in the machine tool. Examples of the shape of the shank part 7 may include straight shank, long shank, long neck and tapered shank.

The cutting part 3 may include a cutting edge 11 located on a side of the front end 1a, and a first flute 13 extended from the cutting edge 11 toward the rear end 1b in the non-limiting embodiment illustrated in FIG. 1.

Figure 2:
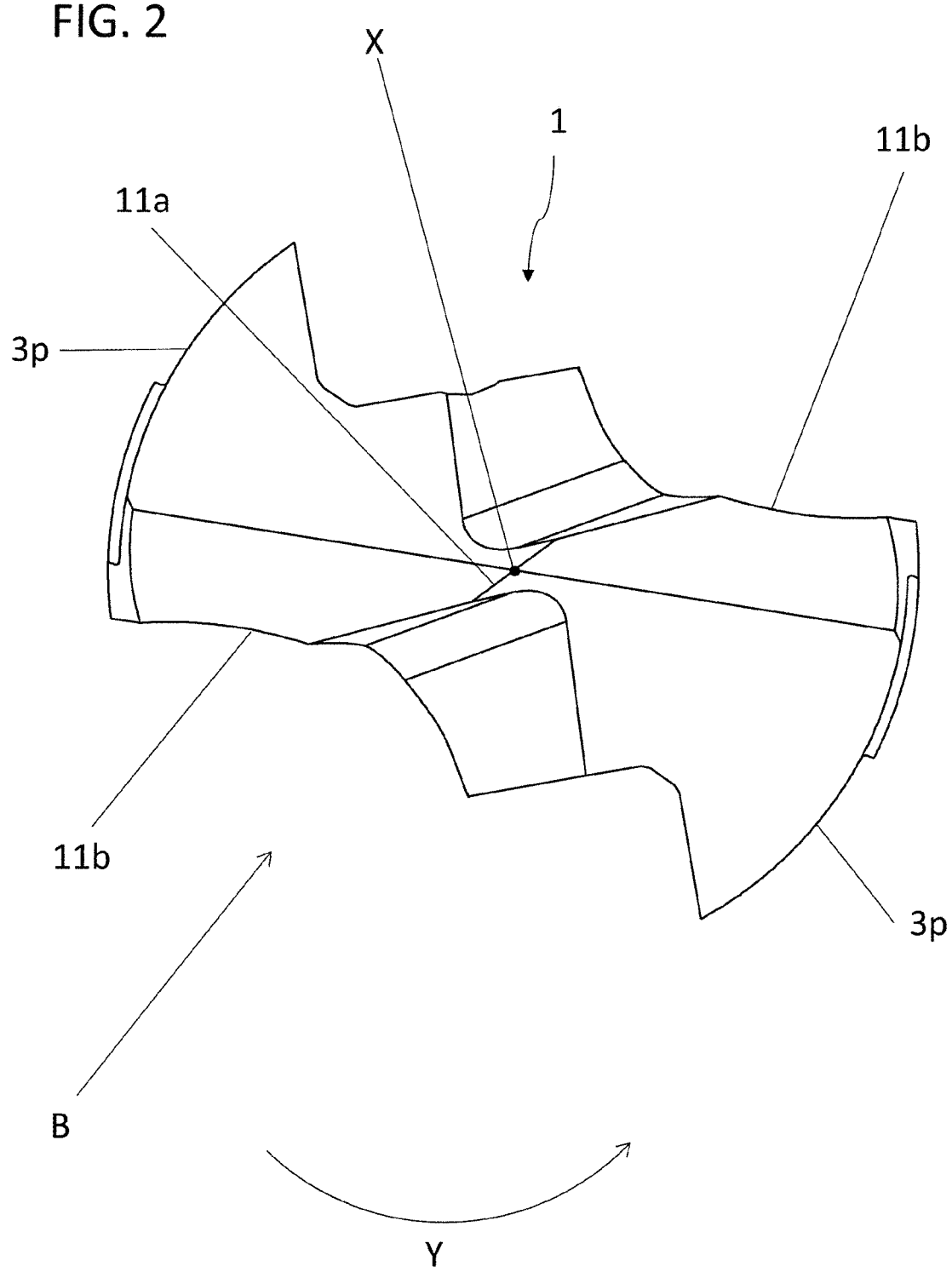
FIG. 2 is a front view of a cutting part in the drill illustrated in FIG. 1 as viewed toward a first end.
Figure 3:
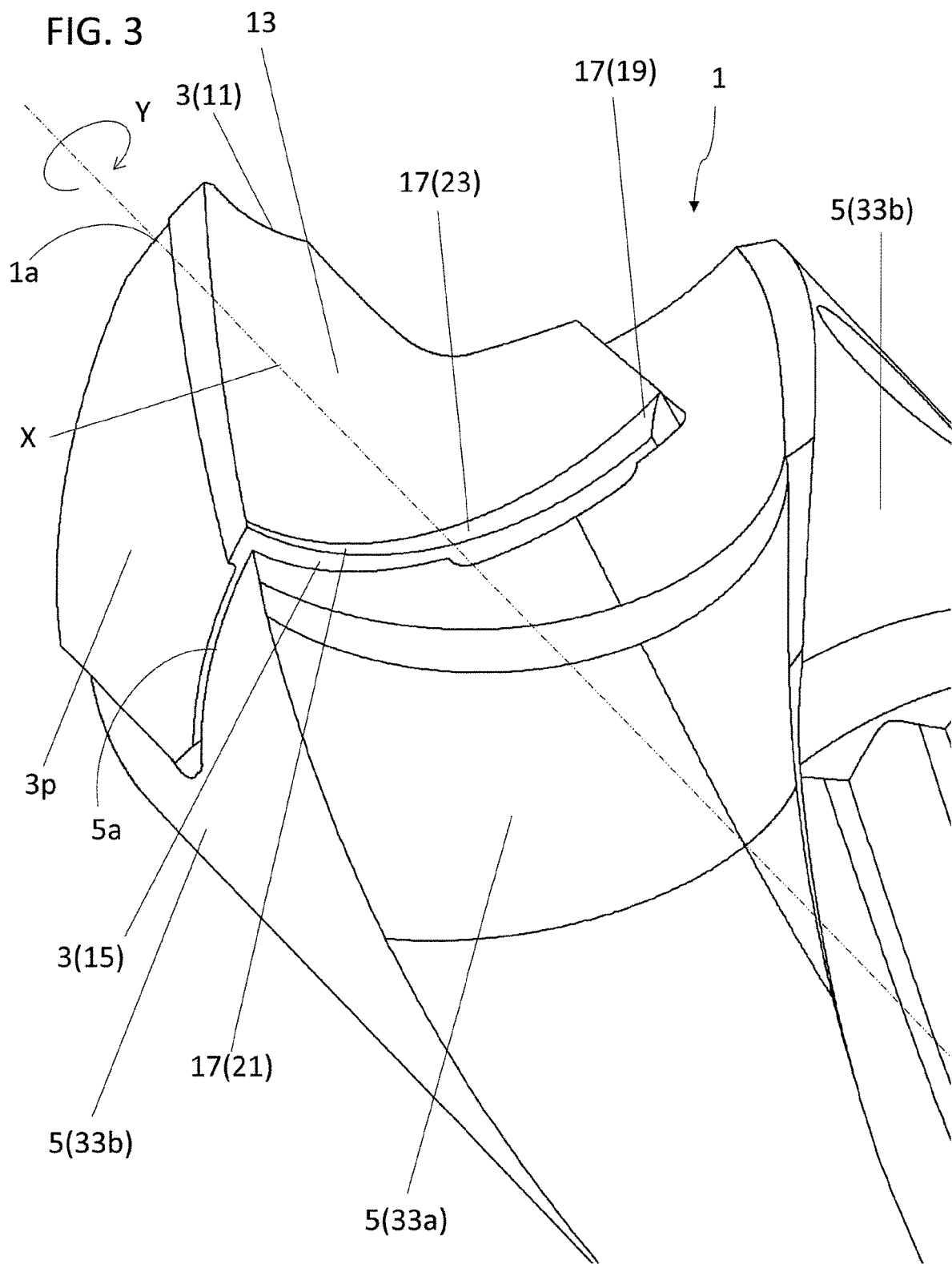
FIG. 3 is an enlarged view of a region A illustrated in FIG. 1.

An outer surface of the cutting part 3 may include a first outer peripheral surface 3p whose distance from the rotation axis X is approximately constant in the non-limiting embodiment illustrated in FIGS. 1 to 3. Hereinafter, the first outer peripheral surface 3p may also be referred to as an outer periphery 3p.

The cutting edge 11 may include a chisel cutting edge 11a including the rotation axis X, and a main cutting edge 11b as viewed toward the front end 1a as illustrated in FIG. 2. The chisel cutting edge 11a may be located so as to include the front end 1a in the non-limiting embodiment illustrated in FIG. 2. The main cutting edge 11b may be extended from the chisel cutting edge 11a toward the outer periphery 3p of the cutting part 3 in the non-limiting embodiment illustrated in FIG. 2.

The first flute 13 may be extended straight or twistingly from the cutting edge 11 toward the rear end 1b. The first flute 13 may be extended twistingly from the cutting edge 11 toward the rear end 1b in the non-limiting embodiment illustrated in FIGS. 1 and 3. The term "being extended twistingly" may denote being extended approximately twistingly from the cutting edge 11 toward a side of the rear end 1b. The first flute 13 may therefore include a part that is not partially twisted. If the first flute 13 is extended twistingly, a helix angle of the first flute 13 is not limited to a specific value, but may be settable to, for example, approximately 3-45°.

The cutting part 3 may include an end surface 15 located closer to the rear end 1b than the first flute 13, and a connection surface 17 which is located between the first flute 13 and the end surface 15 and which connects to the first flute 13 and the end surface 15 in the non-limiting embodiment illustrated in FIGS. 1 and 3. The connection surface 17 may be inclined relative to the first flute 13 and the end surface 15.

In cases where the first flute 13 directly connects to the end surface 15 in the absence of the connection surface 17 between the first flute 13 and the end surface 15, stress may be concentrated at a ridgeline part formed by the first flute 13 and the end surface 15 during the cutting process, thus causing a fracture of the cutting part 3.

The cutting part 3 may include the connection surface 17 which is located between the first flute 13 and the end surface 15 and which connects to the first flute 13 and the end surface 15 in the present disclosure. This may make it easier to avoid stress concentration at a specific portion in the vicinity of a boundary between the first flute 13 and the end surface 15 during the cutting process, thus leading to enhanced fracture resistance.

Figure 4:
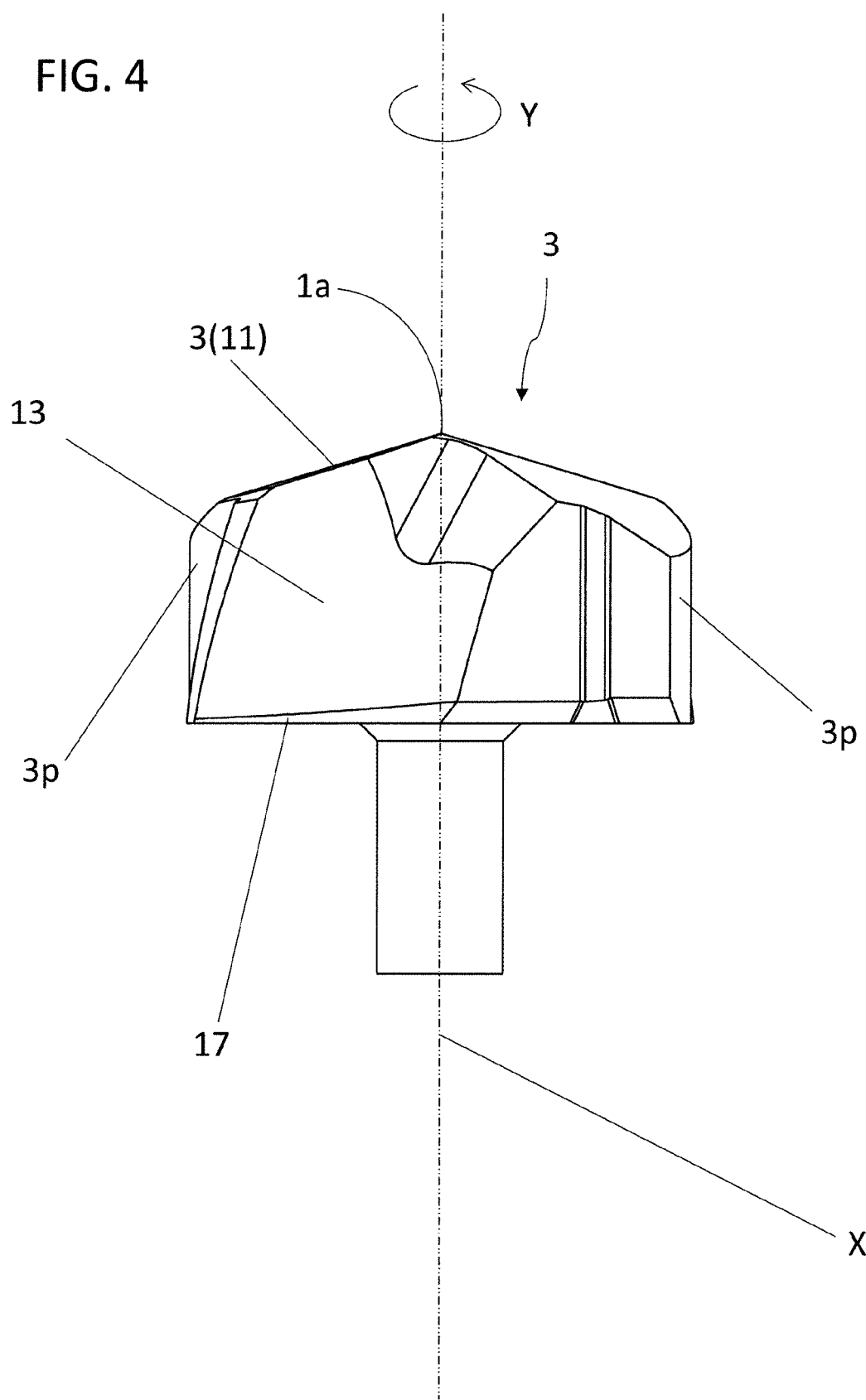
FIG. 4 is a side view of the cutting part illustrated in FIG. 2 as viewed from a B direction.
Figure 5:
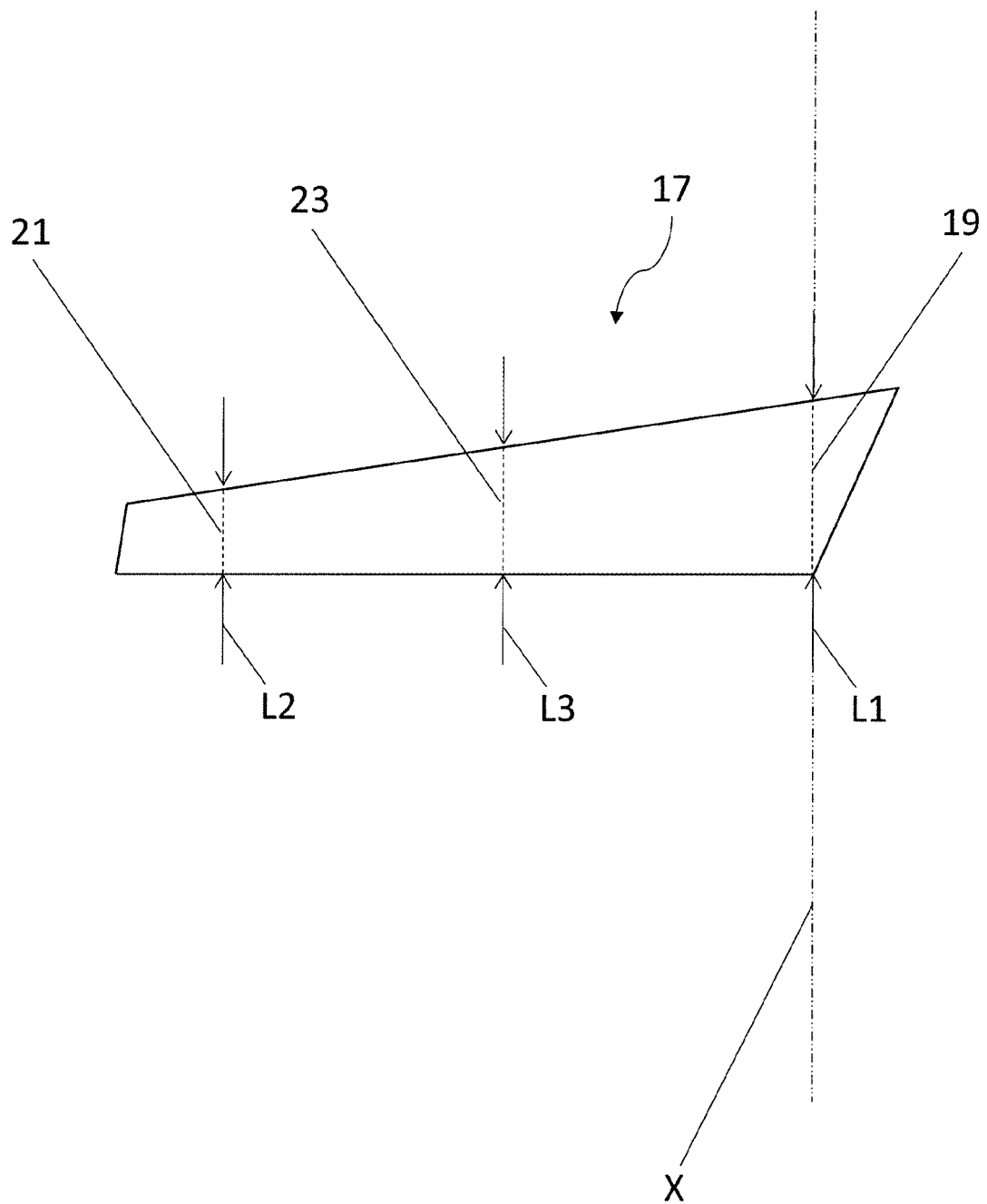
FIG. 5 is an enlarged view of a connection surface in the cutting part illustrated in FIG. 4.

FIG. 4 may be a diagram of the cutting part 3 as viewed from a B direction in FIG. 2. FIG. 5 may be a partially enlarged view of the connection surface 17 in FIG. 4. The connection surface 17 in a non-limiting embodiment illustrated in FIG. 5 may include a first portion 19 and a second portion 21. The first portion 19 may correspond to a portion that is largest in length in a direction along the rotation axis X on the connection surface 17. The second portion 21 may be located closer to the outer periphery 3p of the cutting part 3 than the first portion 19.

A length L2 in a direction along the rotation axis X on the second portion 21 of the connection surface 17 may be smaller than a length L1 in the direction along the rotation axis X on the connection surface 17 if the cutting part 3 is viewed from a direction in which the first portion 19 on the connection surface 17 is overlapped with the rotation axis X and it is orthogonal to the rotation axis X as illustrated in FIGS. 4 and 5.

The first portion 19 and the second portion 21 may be regions indicated by lines in the non-limiting embodiment illustrated in FIG. 5. The first portion 19 may be present as a line region overlapped with the rotation axis X in the non-limiting embodiment illustrated in FIG. 5. The second portion 21 may be located closer to the outer periphery 3p of the cutting part 3 (a left side in FIG. 5) than the first portion 19, and may be present as a line region.

In general, a cutting process may be carried out so as to crush a workpiece in the chisel cutting edge 11a located on a central side of the cutting edge 11. The cutting process may be carried out so as to cut out the workpiece at a main cutting edge 11b of the cutting edge 11 which is located on a side of the outer periphery 3p. A load due to thrust force may therefore be more likely to be significantly applied to a part of the end surface 15 which is located close to the rotation axis X than the side of the outer periphery 3p.

In this case, because the length L1 is relatively large on a side of the rotation axis X, such as the first portion 19, on the connection surface 17, chipping may be less likely to occur around a boundary between the first flute 13 and the end surface 15. Meanwhile, because the length L2 is relatively small on the side of the outer periphery 3p, such as the second portion 21, on the connection surface 17, a chip flow may be less likely to be blocked in the first flute 13. This may lead to excellent durability and chip discharge performance.

The cutting part 3 may be configured so that a width at the second portion 21 of the connection surface 17 may be smaller than a width at the first portion 19 of the connection surface 17 if viewed from a side of the end surface 15. The cutting part 3 thus configured may offer excellent durability and seating stability. A length at the first portion 19 may be relatively large on the side of the rotation axis X, such as the first portion 19 of the connection surface 17 if viewed from the side of the end surface 15. It may be therefore easy to avoid chipping in the vicinity of the boundary between the first flute 13 and the end surface 15. A length at the second portion 21 may be relatively small on the side of the outer periphery 3p, such as the second portion 21 of the connection surface 17 if viewed from the side of the end surface 15. It may therefore be easy to ensure a large area of the end surface 15.

Alternatively, the connection surface 17 in the direction along the rotation axis X may have a smaller length as separating from the first portion 19 on a side (a right side in FIG. 5) opposite to a side (a left side in FIG. 5) where the second portion 21 is located on the basis of the first portion 19 as illustrated in FIG. 5. Still alternatively, the length of the connection surface 17 in the direction along the rotation axis X on the connection surface 17 may be kept constant on the side opposite to the side where the second portion 21 is located, on the basis of the first portion 19.

The connection surface 17 may include a third portion 23 located between the first portion 19 and the second portion 21 in the non-limiting embodiment illustrated in FIG. 5. A length L3 in the direction along the rotation X at the third portion 23 may be smaller than the length L1 in the direction along the rotation axis X at the first portion 19, and may also be larger than the length L2 in the direction along the rotation axis X at the second portion 21. This configuration may achieve a moderate change in length in the direction along the rotation axis X on the connection surface 17. The cutting part 3 may have enhanced fracture resistance in the non-limiting embodiment illustrated in FIG. 5.

The third portion 23 may be located closer to the outer periphery 3p of the cutting part 3 than the first portion 19 and located more away from the side of the outer periphery 3p of the cutting part 3 than the second portion 21 in the non-limiting embodiment illustrated in FIG. 5. In other words, the third portion 23 may be located between the first portion 19 and the second portion 21. Like the first portion 19 and the second portion 21, the third portion 23 may be present as a line region.

The length of the connection surface 17 in the direction along the rotation axis X may become smaller as going from the first portion 19 toward the third portion 23 in the non-limiting embodiment illustrated in FIG. 5. This configuration may make it easier to avoid a sharp change in length in the direction along the rotation axis X on the connection surface 17. Consequently, stress may be less likely to be concentrated at a specific portion in the connection surface 17, thus leading to the enhanced fracture resistance of the cutting part 3 in the non-limiting embodiment illustrated in FIG. 5.

Figure 6:
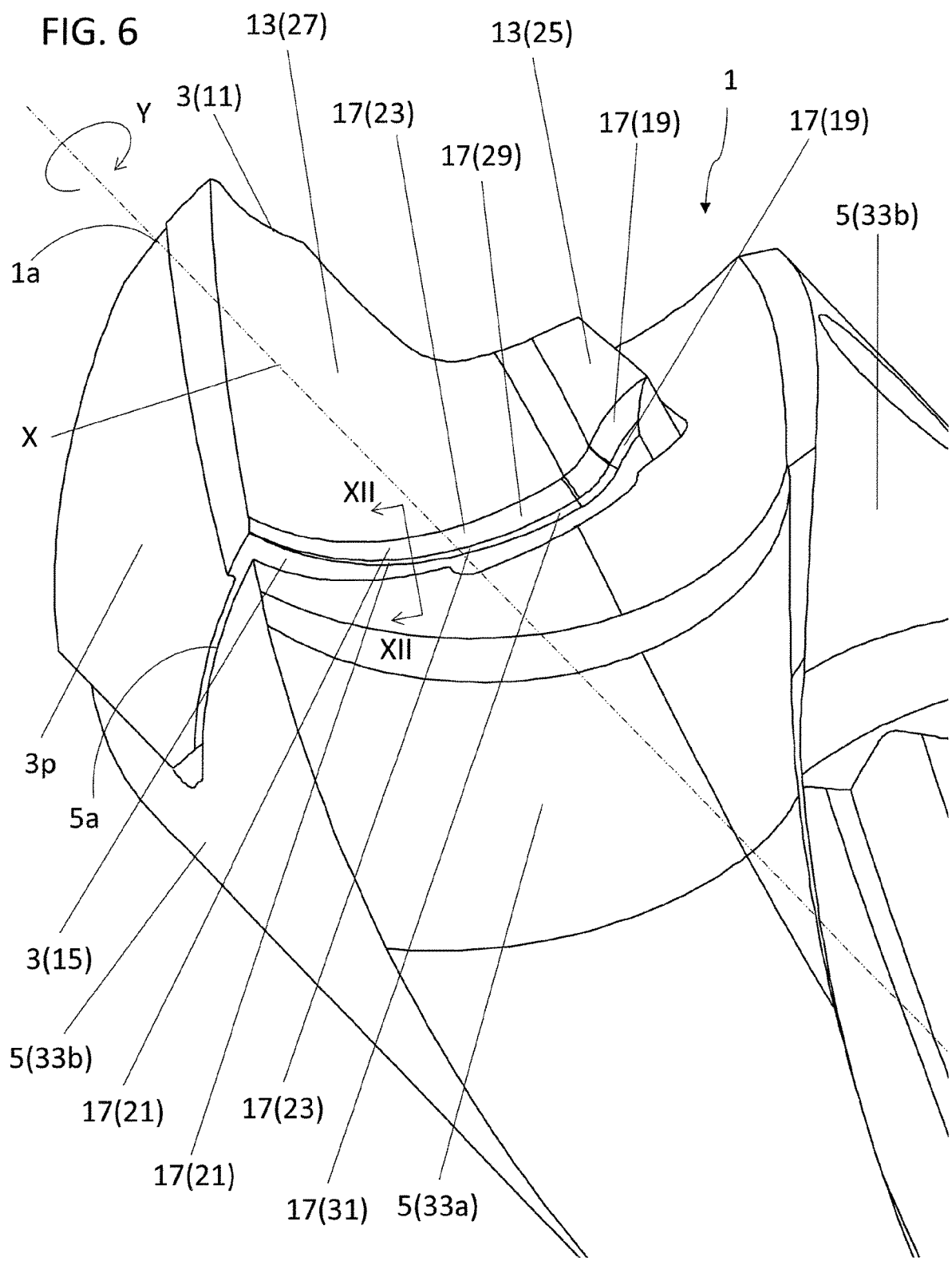
FIG. 6 is an enlarged view illustrating a drill in a non-limiting embodiment.
Figure 7:
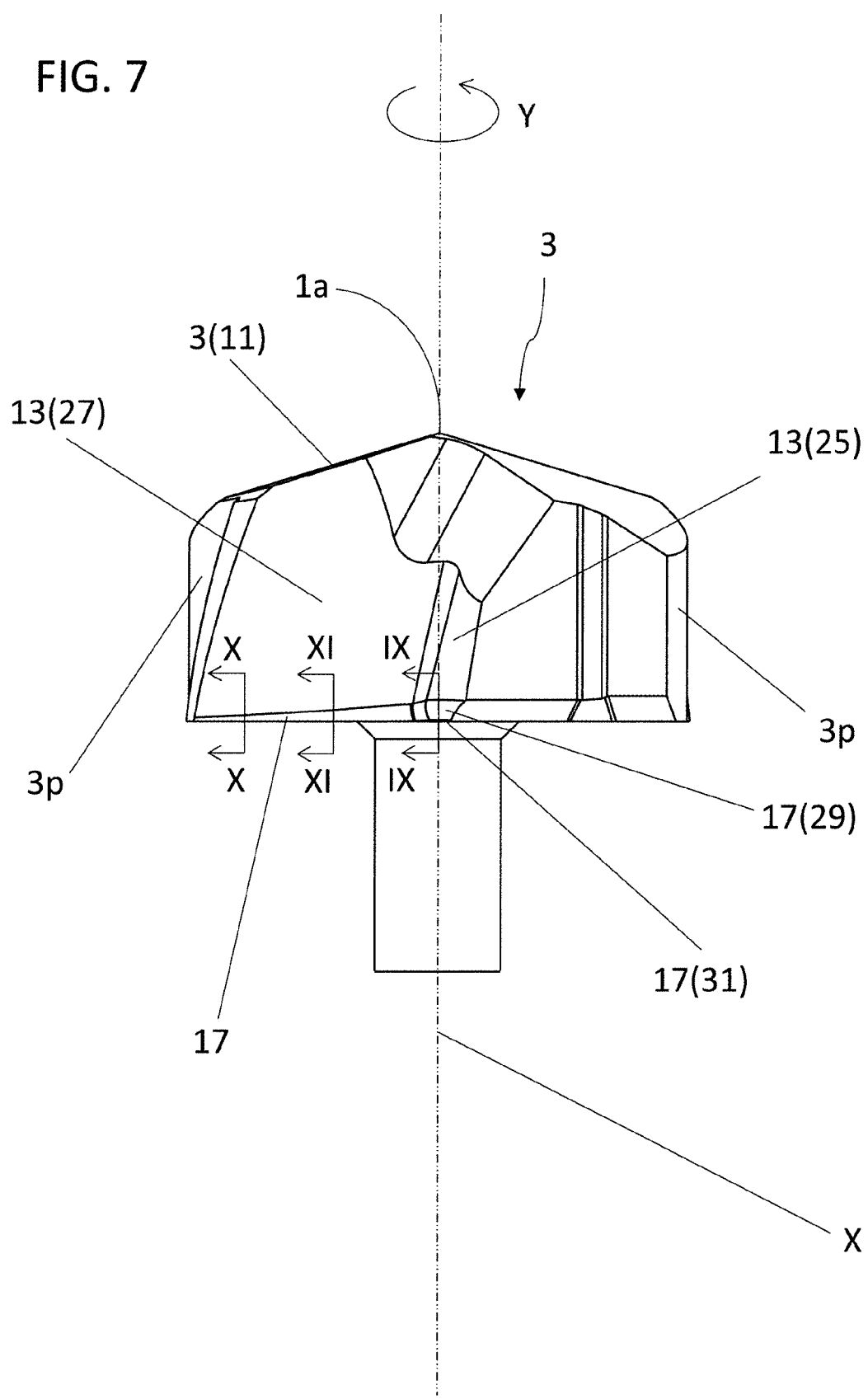
FIG. 7 is a side view illustrating a cutting part in the non-limiting embodiment.

The first flute 13 may include a first portion 25 located on a side of the rotation axis X of the cutting part 3, and a second portion 27 located closer to the outer periphery 3p of the cutting part 3 than the first portion 25 as in a non-limiting embodiment illustrated in FIG. 6 and a non-limiting embodiment illustrated in FIG. 7. The first portion 25 may have a convex curvilinear shape and the second portion 27 may have a concave curvilinear shape in a cross section orthogonal to the rotation axis X.

FIG. 6 may illustrate a drill in the non-limiting embodiment, which is an enlarged view of a region corresponding to FIG. 3. FIG. 7 may illustrate a cutting part in the non-limiting embodiment, which is a side view corresponding to FIG. 4.

With the above configuration, because the first portion 25 has the curved surface shape that is protruded in a direction away from the rotation axis X, the cutting part 3 may have a large web thickness and may therefore have enhanced durability. Excellent chip discharge performance may be attainable if the first flute 13 includes the second portion 27 having the above shape. If the first portion 25 has the convex curvilinear shape and the second portion 27 has the concave curvilinear shape, chips that flow through the second portion 27 to the first portion 25 during a cutting process may tend to be curled by the first portion 25. The drill 1 may therefore have good chip discharge performance.

A length of the connection surface 17 in the direction along the rotation axis X at a portion that connects to the first portion 25 may be larger than a length of the connection surface 17 in the direction along the rotation axis X at a portion that connects to the second portion 27.

If the first flute 13 includes the first portion 25 and the second portion 27 each having the above shape, a larger load due to a flow of chips may be applied to the first portion 25 having the convex curvilinear shape than that to the second portion 27 having the concave curvilinear shape. In this case, if the length in the direction along the rotation axis X at the portion that connects to the first portion 25 on the connection surface 17 is larger than the length in the length along the rotation axis X at the portion that connects to the second portion 27 on the connection surface 17, the first portion 25 may have enhanced durability, and the drill 1 may therefore have enhanced fracture resistance.

Figure 8:
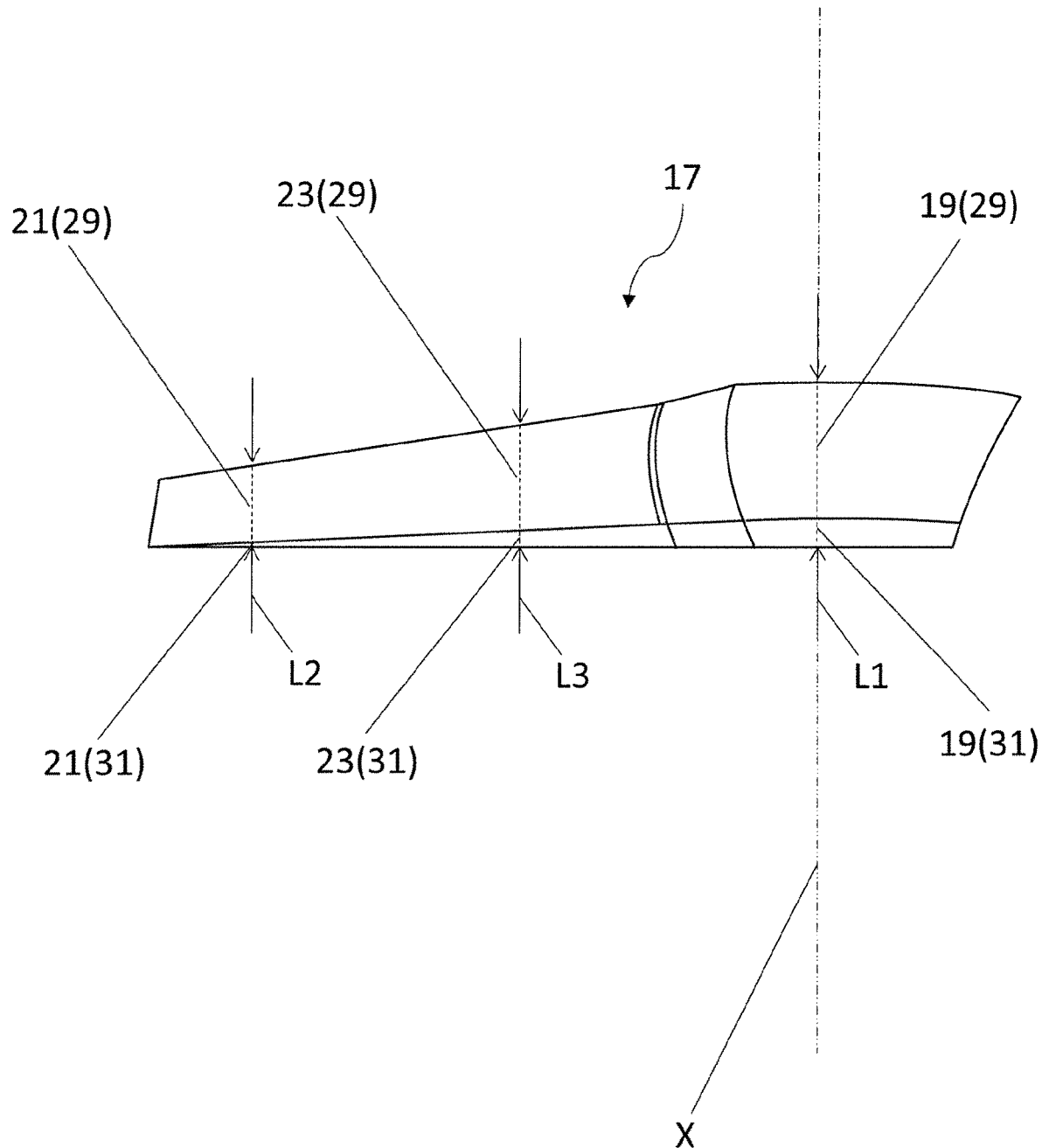
FIG. 8 is an enlarged view of a connection surface in the cutting part illustrated in FIG. 7.

The connection surface 17 may include a first region 29 and a second region 31 that are located along the first flute 13 in the non-limiting embodiment illustrated in FIGS. 6 to 8. The second region 31 may be in contact with the first region 29 and located closer to the end surface 15 than the first region 29. The first region 29 and the second region 31 may be extended in a direction orthogonal to the rotation axis X in the non-limiting embodiment illustrated in FIGS. 6 to 8.

The first region 29 and the second region 31 may have a convex curved surface shape or a flat surface shape. The first region 29 may have the convex curved surface shape and the second region 31 may have the flat surface shape in the non-limiting embodiment illustrated in FIG. 6.

Figure 9:
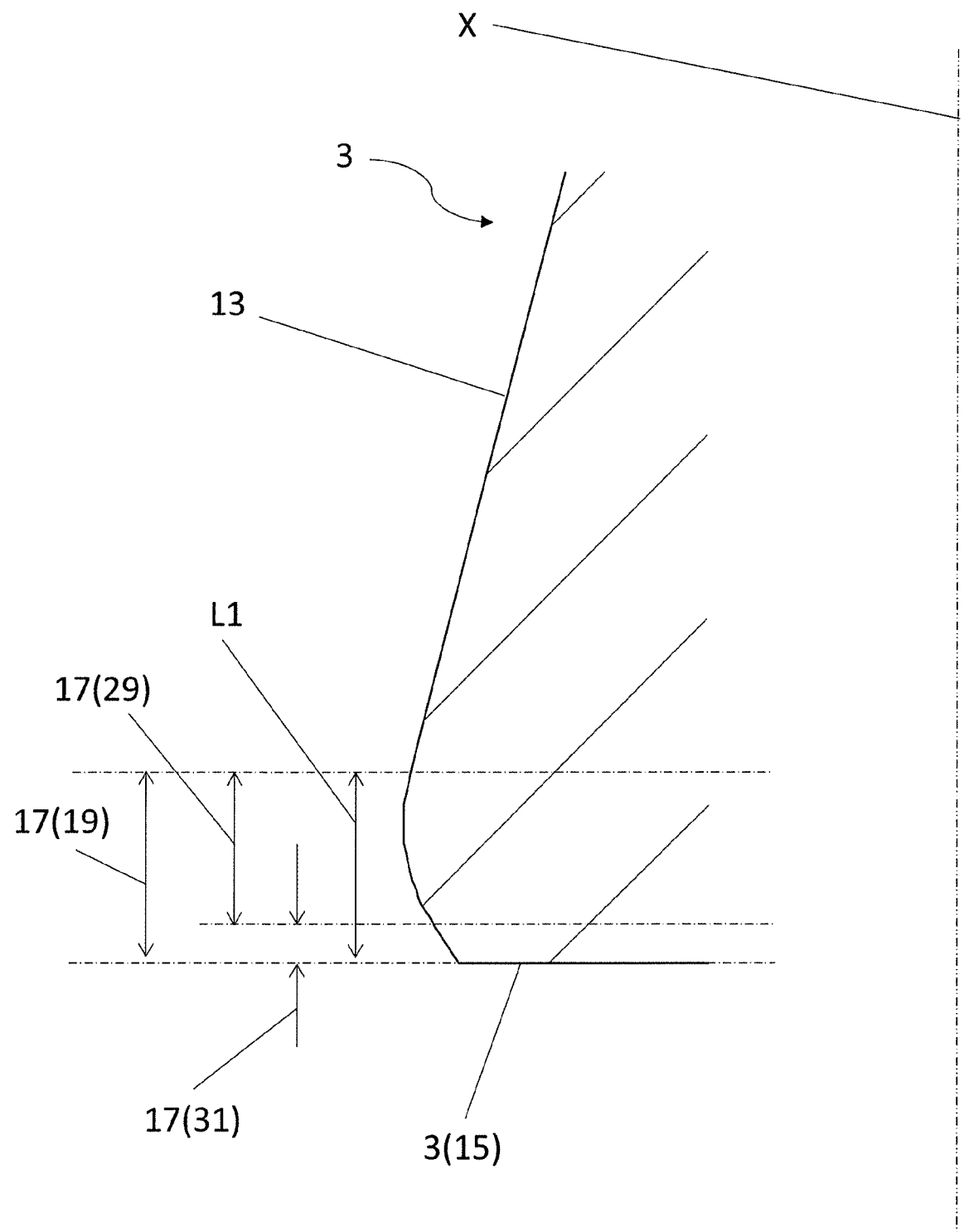
FIG. 9 is a cross-sectional view of the cutting part taken along the line IX-IX of FIG. 7.
Figure 10:
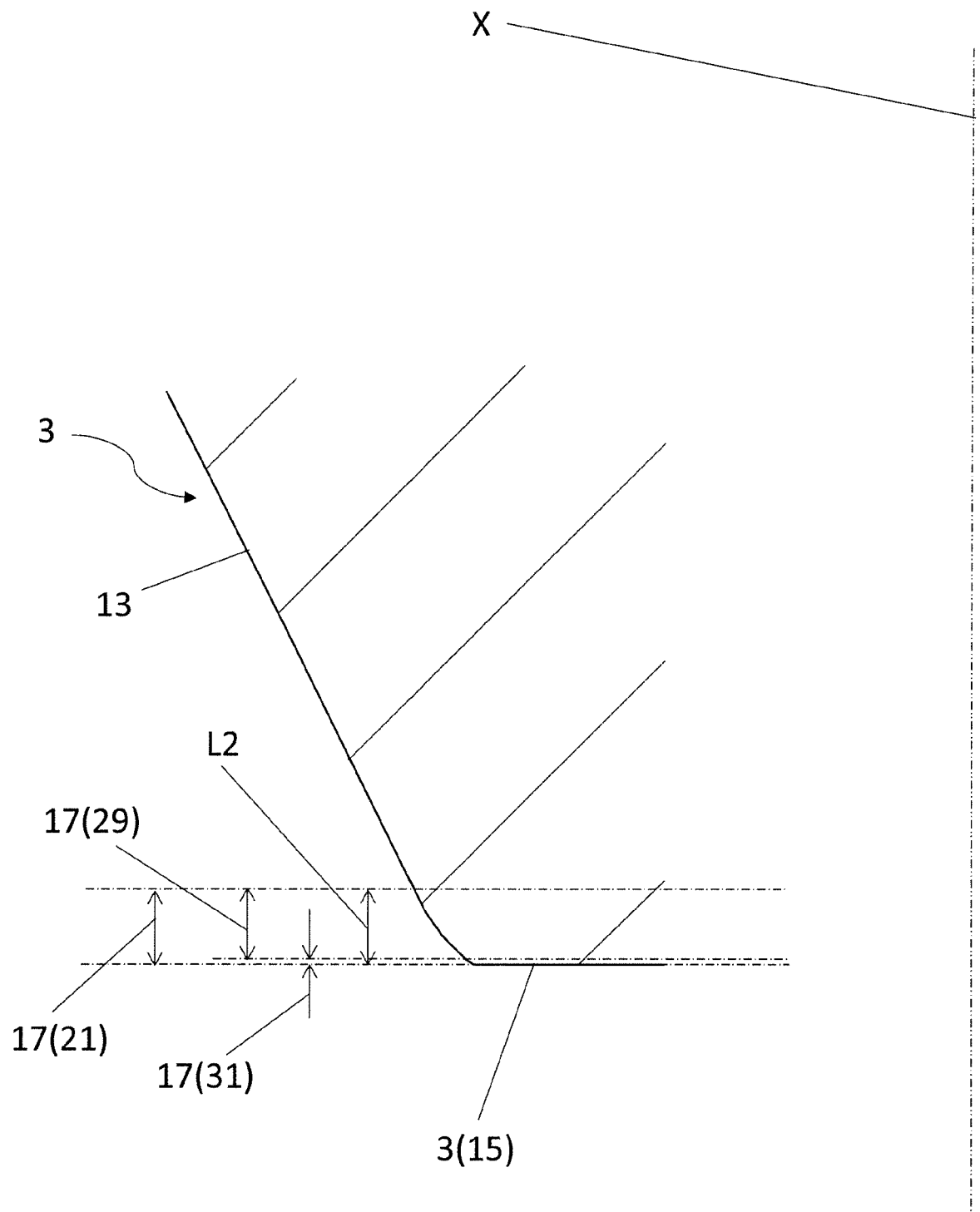
FIG. 10 is a cross-sectional view of the cutting part taken along the line X-X of FIG. 7.
Figure 11:
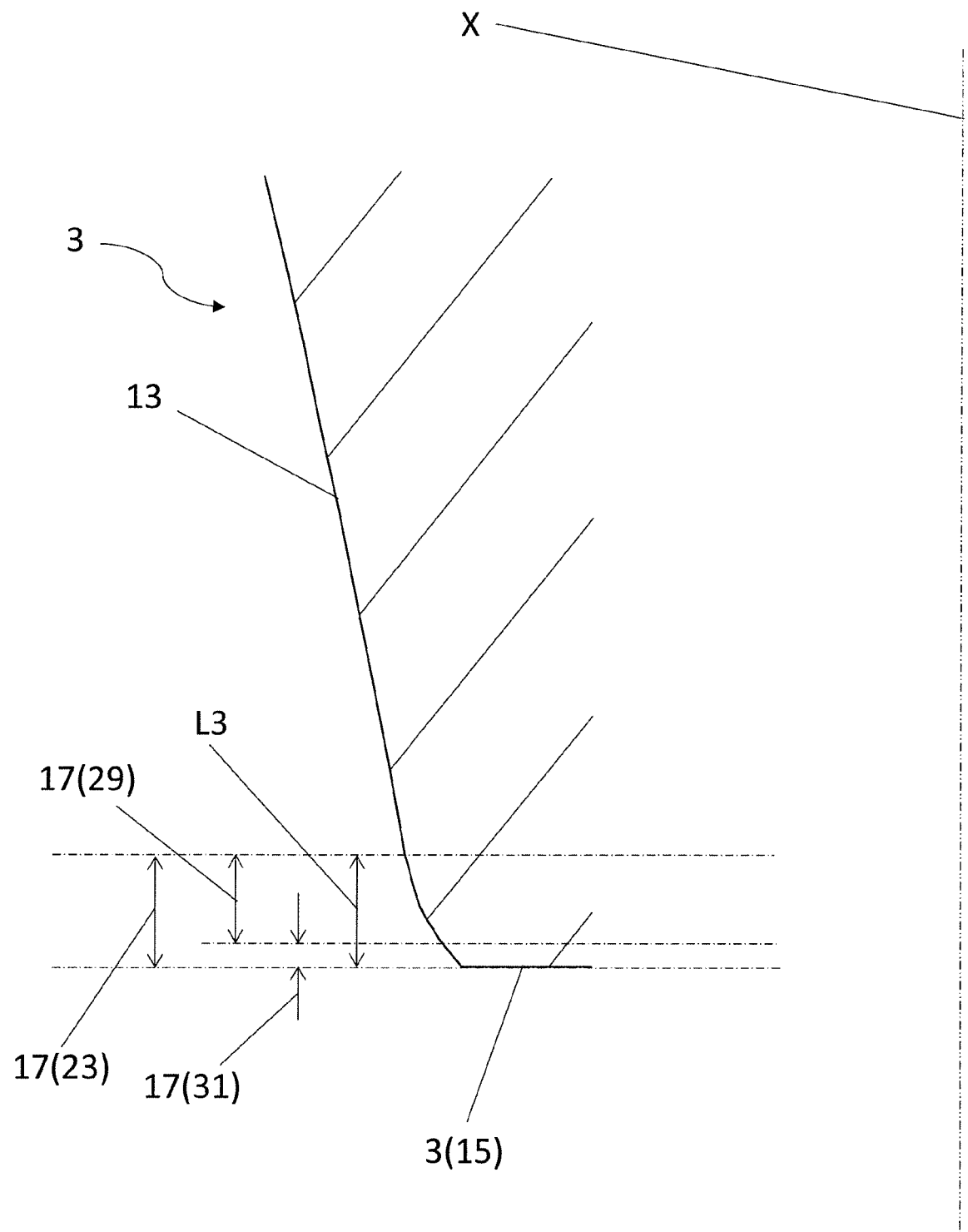
FIG. 11 is a cross-sectional view of the cutting part taken along the line XI-XI of FIG. 7.

FIGS. 9 to 11 may be respectively cross sections taken along the lines IX-IX, X-X and XII-XII in FIG. 7, and may individually illustrate the cross sections orthogonal to a ridgeline formed by the connection surface 17 and the end surface 15. The first region 29 may have a convex curved line in the direction away from the rotation axis X, and the second region 31 may have a straight line shape in the non-limiting embodiment illustrated in FIGS. 9 to 11. Therefore, the first region 29 may have a convex curved surface shape in the direction away from the rotation axis X, and the second region 31 may have the flat surface shape in the non-limiting embodiment illustrated in FIG. 7.

Because the first region 29 has the convex curved surface shape as described above, the connection surface 17 may have enhanced durability. Additionally, the second region 31 located closer to the end surface 15 than the first region 29 may have the flat surface shape, a chip contact area may be smaller than that obtained if the second region 31 has the convex curved surface shape. The second region 31 may therefore be less susceptible to a temperature rise due to chip grazing and welding may be less likely to occur therein.

A shape of the first region 29 in the individual cross sections illustrated in FIGS. 9 to 11 are not limited to a specific shape, but may have, for example, a circular arc shape, an elliptic arc shape or a parabola shape. A radius of curvature of the first region 29 having the convex curved surface shape may be different depending on a location or may be kept constant. The radius of curvature of the first region 29 may be kept constant in the individual cross sections illustrated in FIGS. 9 to 11. The individual cross sections illustrated in FIGS. 9 to 11 may be cross sections in the direction along the rotation axis X.

If the radii of curvature of the first region 29 in the individual cross sections illustrated in FIGS. 9 to 11 are equal to each other, the connection surface 17 may be subjected to stress with less variation. The connection surface 17 may therefore be less susceptible to excessive local stress concentration. This may lead to enhanced fracture resistance of the drill 1 in the non-limiting embodiment illustrated in FIGS. 9 to 11. The radii of curvature of the first region 29 in the individual cross sections illustrated in FIGS. 9 to 11 need not be arithmetically strictly equal to each other, but an allowable range thereof may be an error of approximately 10%.

An arithmetic mean roughness $Sa1$ in the first flute 13 may be larger than or equal to an arithmetic mean roughness $Sa2$ in the connection surface 17. Values of the arithmetic mean roughness Sa1 and the arithmetic mean roughness Sa2 may be selectable according to a material of a workpiece and machining conditions.

If the arithmetic mean roughness Sa1 of the first flute 13 is relatively large, it may be possible to suitably slow down chips grazing along the first flute 13 during the cutting process. It may therefore be easy to control the chip flow and stably curl the chips. If the arithmetic mean roughness Sa2 of the connection surface 17 is relatively small, chip clogging may be less likely to occur at a boundary between the cutting part 3 and the holder 5.

If the arithmetic mean roughness Sa1 is equal to the arithmetic mean roughness Sa2, a chip flow speed may be less likely to change during the time that chips graze along the first flute 13 and the connection surface 17. Consequently, the chip clogging may be less likely to occur in the vicinity of the boundary between the first flute 13 and the connection surface 17. For the above reasons, the drill 1 in the above non-limiting embodiment may have good chip discharge performance.

The arithmetic mean roughness Sa may be a parameter of surface physical properties prescribed in ISO25178, and a parameter obtained by extending an arithmetic mean height Ra of a line onto a surface. Specifically, the arithmetic mean roughness Sa may indicate an average of absolute values of differences in height of individual points on a target surface relative to an average surface of a surface of a measurement object.

Sa1 and Sa2 are not limited to a specific value. For example, Sa1 may be settable to approximately 1-50 μm, and Sa2 may be settable to approximately 1-50 μm.

The arithmetic mean roughness Sa1 of the first flute 13 may be calculated by measuring a surface shape of the first flute 13 based on ISO25178-6:2010 standard. In this case, a cutoff value may be fixed to, for example, 5 mm. The arithmetic mean roughness Sa2 of the connection surface 17 may be calculated by measuring a surface shape of the connection surface 17 based on ISO25178-6:2010 standard. In this case, a cutoff value may be fixed to, for example, 5 mm. The surface shapes of the first flute 13 and the connection surface 17 may be measurable by, for example, a contact-type surface roughness measuring instrument using a probe or a non-contact type measuring instrument using laser.

The holder 5 may include a front end surface 5a located on a side of a tip 1a in the non-limiting embodiment illustrated in FIGS. 1 and 3. The front end surface 5a of the holder 5 may be in contact with the end surface 15 of the cutting part 3. The term "being in contact with" may denote that the end surface 15 need not be entirely in contact with the front end surface 5a, but a part of the end surface 15 may not be in contact therewith.

An outer surface 33 of the holder 5 may include a second flute 33a and a second outer peripheral surface 33b in the non-limiting embodiment illustrated in FIGS. 1 and 3. The second flute 33a in the holder 5 may connect to the first flute 13 in the cutting part 3. Hence, chips generated during the cutting process may be capable of flowing through the first flute 13 to the second flute 33a. The second outer peripheral surface 33b in the holder 5 may connect to the first outer peripheral surface 3p in the cutting part 3.

Figure 12:
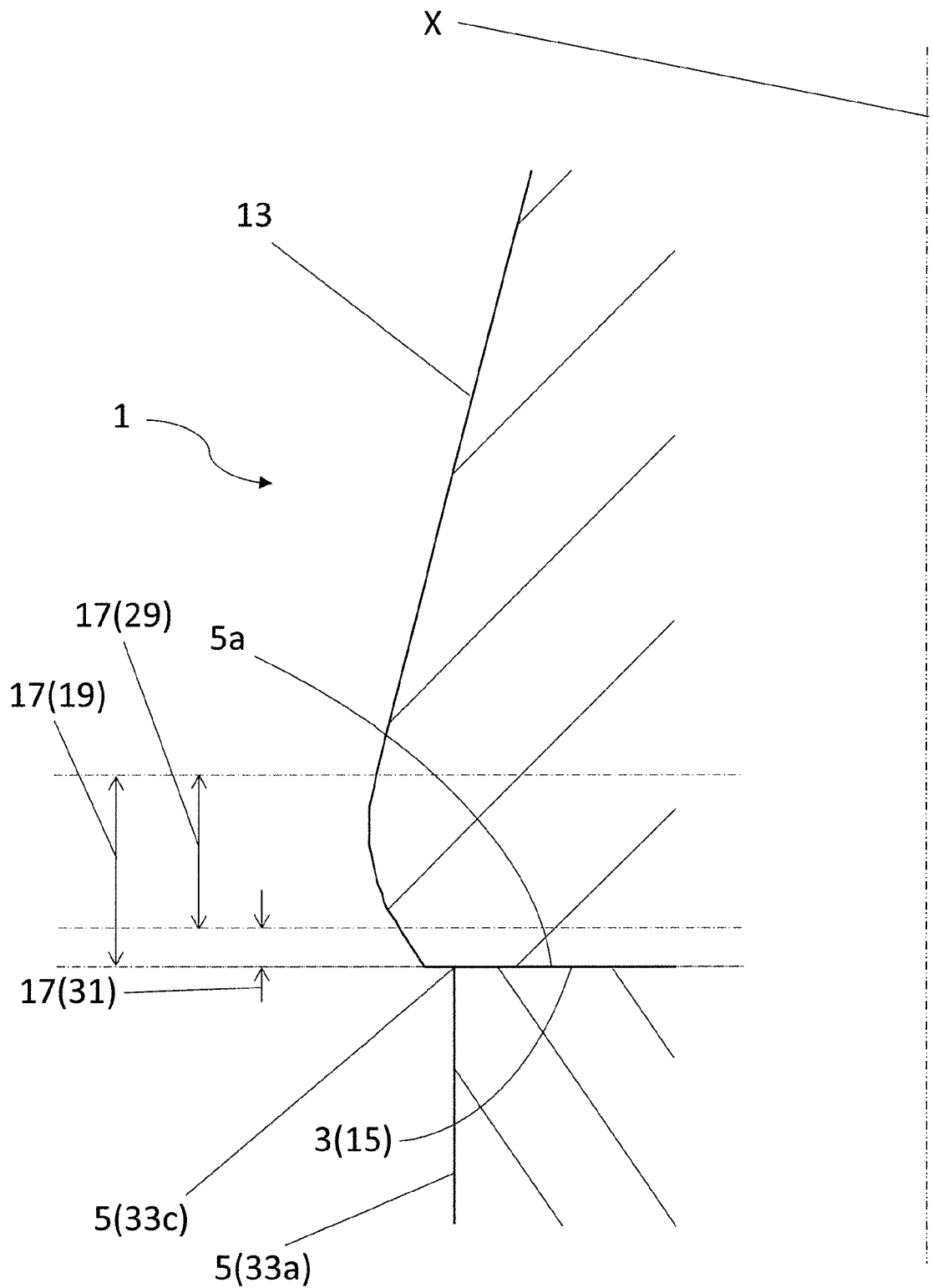
FIG. 12 is a cross-sectional view of the cutting part taken along the line XII-XII of FIG. 6.

The first region 29 may be located more away from the rotation axis X than the outer surface 33 of the holder 5 in a cross section illustrated in FIG. 12. Specifically, the first region 29 may be located more away from the rotation axis X than a ridgeline where the front end surface 5a of the holder 5 intersects with the outer surface 33. The first region 29 may be located more away from the rotation axis X than the second flute 33a in a non-limiting embodiment illustrated in FIG. 12. Specifically, the first region 29 may be located more away from the rotation axis X than a ridgeline 33c where the front end surface 5a of the holder 5 intersects with the second flute 33a in the non-limiting embodiment illustrated in FIG. 12. FIG. 12 may be a cross section of the drill 1 taken along the line XII-XII illustrated in FIG. 6.

If the first region 29 is located more away from the rotation axis X than the second flute 33a, chips may tend to smoothly move forward from the first flute 13 to the second flute 33a. Hence, chips may tend to graze along the connection surface 17 and chip clogging may be less likely to occur in the vicinity of the boundary between the cutting part 3 and the holder 5. The drill 1 may therefore have good chip discharge performance in the non-limiting embodiment illustrated in FIG. 12.

Examples of materials of the cutting part 3 may include cemented carbide and cermet. Examples of compositions of the cemented carbide may include WC—Co, WC—TiC—Co and WC—TiC—TaC—Co. Here, WC, TiC and TaC may be hard particles, and Co may be a binding phase.

The cermet may be a sintered composite material obtainable by compositing metal into a ceramic component. Examples of the cermet may include titanium compounds composed mainly of titanium carbide (TiC) or titanium nitride (TiN). However, there may be no intention to limit the material of the cutting part 3 to the above compositions.

A surface of the cutting part 3 may be coated with a coating film by using chemical vapor deposition (CVD) method or physical vapor deposition (PVD) method. Examples of composition of the coating film may include titanium carbide (TiC), titanium nitride (TiN), titanium carbonitride (TiCN) and alumina ($Al_2O_3$).

As a material of the holder 5, steel, cast iron or aluminum alloy may be usable. Steel may be preferable in view of high rigidity.

<Method for Manufacturing Machined Product>

A method for manufacturing a machined product in a non-limiting embodiment may be described in detail below by exemplifying the case of using the drill 1 in the foregoing non-limiting embodiments. The following description may be made with reference to FIGS. 13 to 15.

The method for manufacturing a machined product in the non-limiting embodiment may include the following steps:

(1) rotating the drill 1 around the rotation axis X;

(2) bringing the cutting edge in the drill 1 being rotated into contact with the workpiece 100; and (3) moving the drill 1 away from the workpiece 100.

Figure 13:
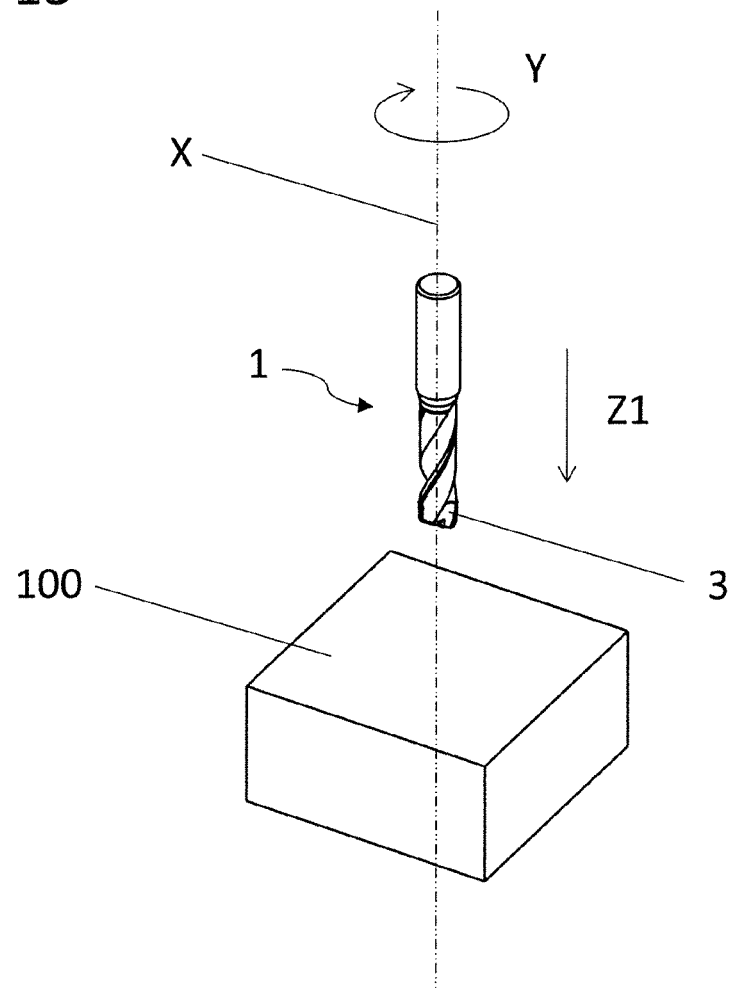
FIG. 13 is a diagram illustrating one of the steps in a method for manufacturing a machined product in a non-limiting embodiment.

More specifically, firstly, the drill 1 may be relatively brought near the workpiece 100 by rotating the drill 1 around the rotation axis X and also moving the drill 1 in a Z1 direction along the rotation axis X, as illustrated in FIG. 13.

Figure 14:
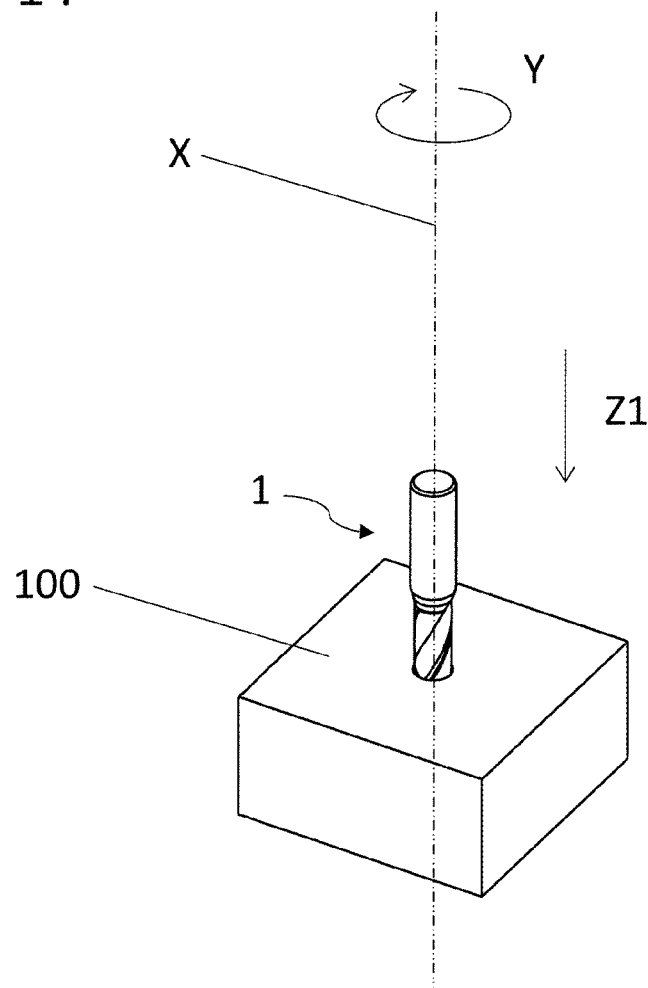
FIG. 14 is a diagram illustrating one of the steps in the method for manufacturing a machined product in the non-limiting embodiment.
Figure 15:
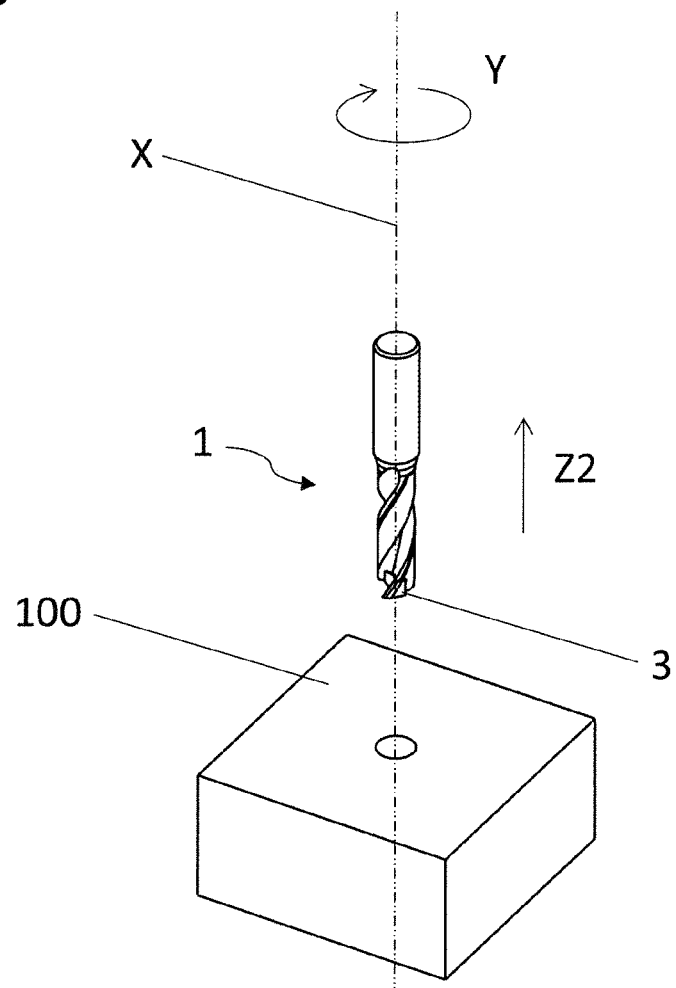
FIG. 15 is a diagram illustrating one of the steps in the method for manufacturing a machined product in the non-limiting embodiment.

Subsequently, the workpiece 100 may be cut out by bringing the cutting edge of the drill 1 into contact with the workpiece 100 as illustrated in FIG. 14. The drill 1 may be then relatively moved away from the workpiece 100 by moving the drill 1 in a Z2 direction as illustrated in FIG. 15.

The drill 1 may be brought near the workpiece 100 in a state where the workpiece 100 is fixed and the drill 1 is rotated around the rotation axis X in the non-limiting embodiment. In FIG. 14, the workpiece 100 may be cut out by bringing the cutting edge of the drill 1 being rotated into contact with the workpiece 100. In FIG. 15, the workpiece 100 may be moved away from the workpiece 100 in a state where the drill 1 is rotated.

In a cutting process with the manufacturing method in the non-limiting embodiment, the drill 1 may be brought into contact with the workpiece 100, or the drill 1 may be moved away from the workpiece 100 by moving the drill 1 in each of the steps. However, there is no intention to limit to the above non-limiting embodiment.

For example, the workpiece 100 may be brought near the drill 1 in the step (1). Similarly, the workpiece 100 may be moved away from the drill 1 in the step (3). If it is desired to continue the cutting process, the step of bringing the cutting edge of the drill 1 into contact with different portions of the workpiece 100 may be repeated while the drill 1 is kept rotating.

Representative examples of the material of the workpiece 100 may include aluminum, carbon steel, alloy steel, stainless steel, cast iron and non-ferrous metal.

DESCRIPTION OF THE REFERENCE NUMERAL

1 drill
1*a* first end (front end)
1*b* second end (rear end)
3 cutting part
3*p* first outer peripheral surface
5 holder
5*a* front end surface
7 shank part
9 body
11 cutting edge
11*a* chisel cutting edge
11*b* main cutting edge
13 first flute
15 end surface
17 connection surface
19 first portion
21 second portion
23 third portion
25 first part
27 second part
29 first region
31 second region
33 outer surface
33*a* second flute
33*b* second outer peripheral surface
100 workpiece
X rotation axis
Y rotation direction
Z cutting direction

The invention claimed is:

1. A drill, having a columnar shape extended from a first end to a second end and comprising:
   a cutting part rotatable around a rotation axis,
   the cutting part comprising
      a cutting edge located on a side of the first end,
      a flute extended from the cutting edge toward the second end,
      an end surface located closer to the second end than the flute, and
      a connection surface which is located between the flute and the end surface and connects to the flute and the end surface,
   the connection surface comprising
      a first portion, and
      a second portion located closer to an outer periphery of the cutting part than the first portion, wherein
   a length in a direction along the rotation axis on the second portion is smaller than a length in the direction along the rotation axis on the first portion in a side view orthogonal to the rotation axis,
   the flute comprises
      a first portion which has a convex curvilinear shape on a cross section orthogonal to the rotation axis, and
      a second portion which is located closer to the outer periphery of the cutting part than the first portion and has a concave curvilinear shape in the cross section, and
   a length in the direction along the rotation axis on a part of the connection surface which connects to the first portion is larger than a length in the direction along the rotation axis on a part of the connection surface which connects to the second portion in the side view.

2. The drill according to claim 1, wherein
   the connection surface comprises a third portion located between the first portion and the second portion, and
   a length in the direction along the rotation axis on the third portion is smaller than the length in the direction along the rotation axis on the first portion, and is larger than the length in the direction along the rotation axis on the second portion in the side view.

3. The drill according to claim 2, wherein a length along the rotation axis on the connection surface becomes smaller as going from the first portion toward the second portion in the side view.

4. A method for manufacturing a machined product, comprising:
   rotating the drill according to claim 1;
   bringing the drill being rotated into contact with a workpiece; and
   moving the drill away from the workpiece.

5. The drill according to claim 1, wherein
   the first portion has a first width orthogonal to the rotation axis,
   the second portion has a second width orthogonal to the rotation axis, and
   the second width is smaller than the first width in a front view of the end surface.

6. A drill, having a columnar shape extended from a first end to a second end and comprising:
   a cutting part rotatable around a rotation axis,
   the cutting part comprising
      a cutting edge located on a side of the first end,
      a flute extended from the cutting edge toward the second end,
      an end surface located closer to the second end than the flute, and
      a connection surface which is located between the flute and the end surface and connects to the flute and the end surface,
   the connection surface comprising
      a first portion, and
      a second portion located closer to an outer periphery of the cutting part than the first portion, wherein
   a length in a direction along the rotation axis on the second portion is smaller than a length in the direction along the rotation axis on the first portion in a side view orthogonal to the rotation axis,
   the connection surface comprises a first region and a second region each being located along the flute,
   the second region is in contact with the first region and located closer to the end surface than the first region,
   the first region has a convex curved shape, and
   the second region has a flat shape.

7. The drill according to claim 6, wherein a radius of curvature of the first region is kept constant.

8. The drill according to claim 6, further comprising:
a holder having a columnar shape and comprising
a front end surface being in contact with the end surface of the cutting part, and
an outer surface, and
the first region of the connection surface is located more away from the rotation axis than the outer surface.

9. The drill according to claim 8, wherein
the cutting part further comprises a first outer peripheral surface whose distance from the rotation axis X is approximately constant,
the outer surface of the holder comprises
a second flute connecting to the flute of the cutting part, and
a second outer peripheral surface connecting to the first outer peripheral surface, and
the first region of the connection surface is located more away from the rotation axis than the second flute.

10. A method for manufacturing a machined product, comprising:
rotating the drill according to claim 6;
bringing the drill being rotated into contact with a workpiece; and
moving the drill away from the workpiece.

11. A drill, having a columnar shape extended from a first end to a second end and comprising:
a cutting part rotatable around a rotation axis,
the cutting part comprising
a cutting edge located on a side of the first end,
a flute extended from the cutting edge toward the second end,
an end surface located closer to the second end than the flute, and
a connection surface which is located between the flute and the end surface and connects to the flute and the end surface,
the connection surface comprising
a first portion, and
a second portion located closer to an outer periphery of the cutting part than the first portion, wherein
a length in a direction along the rotation axis on the second portion is smaller than a length in the direction along the rotation axis on the first portion in a side view orthogonal to the rotation axis, and
an arithmetic mean roughness of the flute is equal to an arithmetic mean roughness of the connection surface.

12. A method for manufacturing a machined product, comprising:
rotating the drill according to claim 11;
bringing the drill being rotated into contact with a workpiece; and
moving the drill away from the workpiece.

* * * * *